G. J. COUCHOIS.
RESILIENT TIRE.
APPLICATION FILED JUNE 12, 1917.
1,256,877.
Patented Feb. 19, 1918.
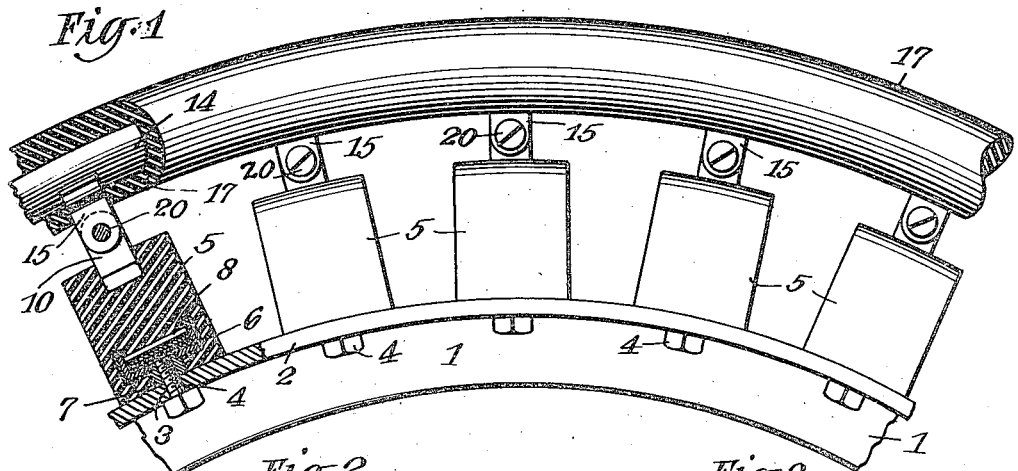
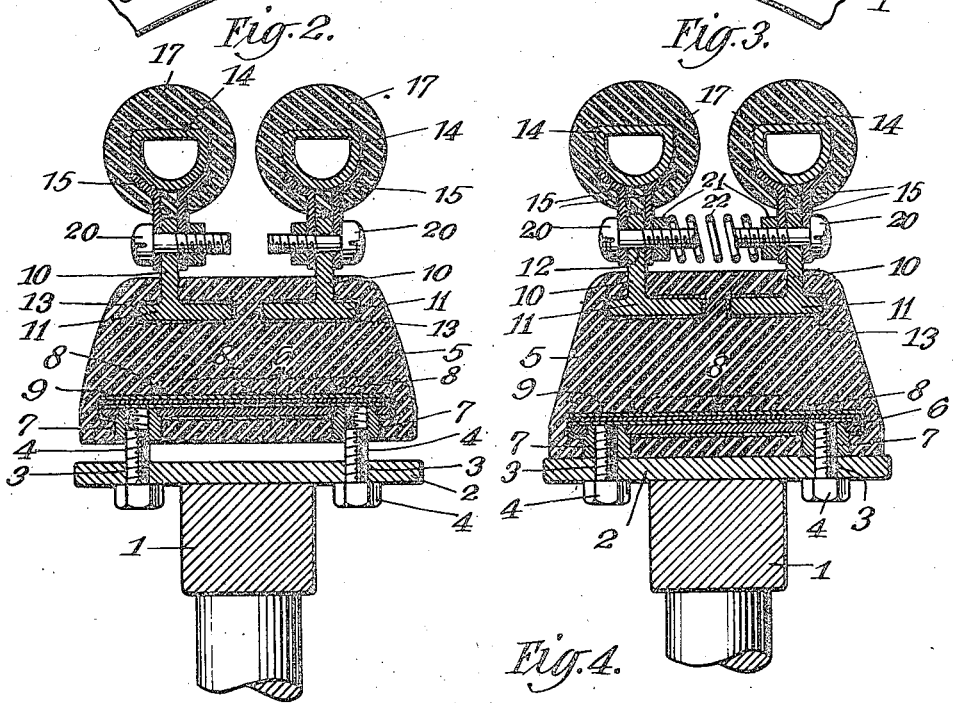
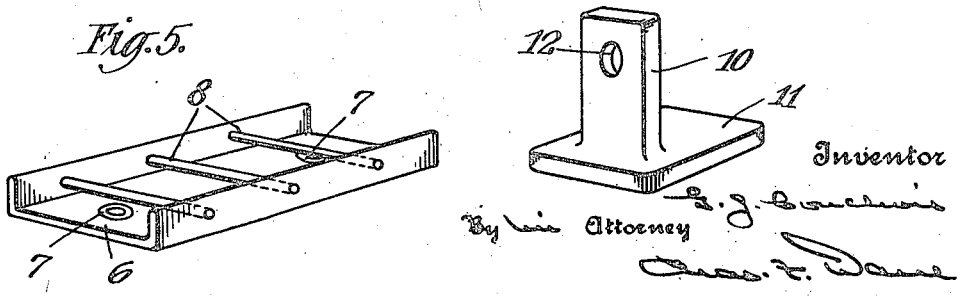
Inventor
G. J. Couchois
By his Attorney

UNITED STATES PATENT OFFICE.

GARRETT JOHN COUCHOIS, OF RUTHERFORD, NEW JERSEY, ASSIGNOR TO COUCHOIS TIRE CORPORATION, OF NEW YORK, N. Y., A CORPORATION OF NEW YORK.

RESILIENT TIRE.

1,256,877.　　　　　　Specification of Letters Patent.　　Patented Feb. 19, 1918.

Application filed June 12, 1917. Serial No. 174,385.

*To all whom it may concern:*

Be it known that I, GARRETT JOHN COUCHOIS, a citizen of the United States, and resident of Rutherford, in the county of Bergen and State of New Jersey, have invented certain new and useful Resilient Tires, of which the following is a specification.

The invention relates to resilient tires and has for its object to provide an improved form of tire in which the cushioning effect of shocks and strains will be distributed throughout the entire body of the tire, which presents a relatively small proportion of its circumferential area to contact with the road, and which accommodates itself to inequalities and obstructions in the road surface, in all directions, so that a durable, efficient and smooth running structure results, possessing the inherent advantages of the pneumatic tire and the solid resilient tire, without the disadvantages or objections of either. To these ends, the invention comprises a tire including a rigid rim, a spaced tread, which preferably comprises two laterally spaced metal hoops provided with a resilient covering, resilient blocks interposed between the rim and the tread and anchored to both by means which impose a radial tensional stress upon the resilient blocks to stretch the latter, so that there is imposed upon the tread a heavy, uniform tensional stress tending toward the center of the wheel on which the tire is mounted, whereby any distortion or deformation of the tread, due to sudden shock or inequality in the road surface is instantly distributed throughout the entire structure of the tire and dissipated without transference to the vehicle body and the occupants thereof. Exceptionally heavy deformations of the tread are taken up by the immediately adjacent resilient blocks, which pass from a state of tension to one of compression, under the action of the deforming force, and also by the resilient blocks disposed throughout the circumference of the tire, and which, because of their positive connection with the tread are subjected to additional tensional strains.

The invention is illustrated in the accompanying drawings, in which,

Figure 1 is a fragmentary view, partly in section, of a wheel having the resilient tire applied thereto.

Fig. 2 is a cross section showing the relative disposition and arrangement of the parts of the tire in the preliminary assembling operation.

Fig. 3 is a similar view showing the relation of the parts when the tire is completely assembled and the resilient blocks placed under tension.

Fig. 4 is a perspective view of one of the outer anchoring members.

Fig. 5 is a perspective view of one of the inner anchoring members or plates.

Referring to the drawings, 1 indicates a vehicle wheel, which may be of any convenient or preferred construction and which is provided with a rigid metal rim 2 provided in its laterally extending side portions with peripheral series of bolt holes 3, adapted to receive screw-threaded bolts 4.

Associated with the rim 2 is a series of blocks 5, preferably of rubber or other resilient material, spaced at regular intervals around the periphery of the rim. Each of said blocks 5 has embedded in its lower portion a channel-like plate 6, provided with rigidly secured nuts or threaded thimbles 7, adapted to be engaged by the bolts 4 to lock the blocks to the rim. Said anchor plate 6 is also preferably provided with cross bars 8, which serve as additional means for locking the anchor plate to and within the resilient block 5. Preferably, the anchor plate 6 is covered with suitable friction cloth 9 prior to casting the block 5 about said anchor plate to serve as an additional securing means between the material of the block and the anchor plate.

In the outer portion of each of the blocks 5 are secured two anchor members, each comprising a stem 10 and a base 11, which latter is surrounded and embedded in the material of the block, during the operation of molding the latter, and in order to maintain a close union between the anchor members and the material of the block, the anchor members are preferably covered with friction cloth 13.

The tread of the tire is preferably formed of two laterally spaced tubular hoops 14, formed of steel or similar resilient metal, the outer face of which is preferably flattened, and each of which hoops is preferably provided with a cover or envelop of rubber or the like 17, molded thereon and secured thereto by friction cloth.

Secured at appropriate intervals to each of the hoops 14 are clips 15, the lower ends of which are adapted to embrace and be secured by means of bolts 20 to the corresponding lugs 10 of the outer anchoring members embedded in the resilient blocks 5, the clips 15 and the stems 10 of the anchoring members being provided with registering openings to receive the bolts 20.

If desired, a single tread member involving the metal hoop and its resilient sheath or cover may be employed, but in order to compensate for relatively small obstructions or inequalities in the road surface, in a direction transverse to the tread of the tire, two tread sections are employed, as illustrated, and between the alining bolts which secure the tread sections to the outer anchor members, are interposed relatively heavy compression springs 22 which tend to force the tread members apart and also impose a lateral stress or tension upon the upper portion of the rubber blocks between the anchor members 11. These compression springs 20 maintain the two tread members in proper relation, and nevertheless admit of them responding individually to obstructions or irregularities in the road surface.

In assembling a tire of the construction described, the necessary number of resilient blocks 5 with their embedded anchoring members are connected to the tread members 14 by means of the extended ends of the clips 15 engaging the stems 10 of the outer anchoring members. This arrangement of the peripheral series of blocks 5 leaves the lower faces of said blocks spaced at a distance from the outer face of the rim 2. The bolts 4 are then passed through the openings 3 in the rim and engaged with the screw-threaded nuts or sockets 7 on the anchor plates 6 of the several resilient blocks 5. The bolts 4 are then set up until the blocks 5 are drawn into contact with the face of the rim 2. Inasmuch as the steel cores 14 of the tread members are relatively rigid, they serve as an outer anchor or suspension for the blocks 5 and as the latter are drawn by the bolts 4 toward the rim, they are placed under heavy tensional stress in a radial direction and are therefore actually stretched or expanded in the direction of the rim, so that when the blocks are all set up into engagement with the rim, the entire tire is in a high state of tension, the radial force or stress imposed on the several blocks being transferred to the tread members so that the application of any force to the tread members tending to deflect or distort the same is instantly transferred throughout the structure of the tire, including the tread members and the connected resilient blocks 5. The effect of the stress on the resilient blocks in the immediate vicinity of the point of application of said stress, as for example, when the tire strikes an obstruction or depression in the road surface, is to relieve the tension on the immediately adjacent resilient blocks 5, and, if the resultant strain or shock is heavy enough, to convert the stress thereon into one of compression. At the same time, the resultant deformation of the circular contour of the tread results in the transference of the stress to all of the other resilient blocks and imposes an additional tensional strain thereon, thereby absorbing the effect of the shock or blow before the same can be transferred to the vehicle body. Owing to the normally high state of tension of the several resilient blocks 5, the reaction in said blocks in taking up the stress is exceptionally rapid and effective and as the total force producing the deforming stress on the tire is transferred and distributed not only throughout the tread of the tire, but to the individual resilient blocks 5, such force is quickly absorbed and dissipated and even the heaviest shocks encountered in the ordinary operation of the vehicle are insufficient to either damage the tire or the vehicle or to be passed from the tire to the vehicle body.

It will be apparent, therefore, that in the construction of the tire aforesaid, the tensional qualities of the resilient blocks 5, as distinguished from the compressibility of the resilient material, as illustrated in the ordinary rubber tire, are rendered available, and as the whole tire is under heavy tensional stress throughout, it is exceptionally responsive and acts to absorb and distribute shocks and stresses with incredible rapidity. Preferably, the resilient blocks 5 are molded from a suitable rubber composition, and inasmuch as the rate of resiliency of rubber depends upon the extent to which it is stretched or compressed beyond its point of inertia, the obvious advantage of a high rate of resiliency of the blocks 5 is obtained by subjecting the blocks to heavy tensional stress directed toward the center of the wheel. For example, if thirty of the blocks 5 are employed in an ordinary wheel, and each of said blocks is stretched or expanded one-quarter of an inch when bolted into position on the rim 2, there is provided an inwardly tending tensional stress of approximately 125 lbs. on each section, or an aggregate tension of approximately 3750 lbs. on the outer resilient tread sections 14, which tensional stress holds all of the various units or members of the tire in a state of equilibrium, and if this equilibrium is destroyed by deflection at any point, it follows as a necessary consequence that all of the resilient blocks 5 operate to absorb the stress producing the deflection and, as explained, the resilient response of the blocks is so exceedingly rapid as to be practically instantaneous.

As explained, the object of duplicating the tread sections 14 with their resilient coverings 17 is to permit the tire to conform to road inequalities in a crosswise direction, so that, if one of the tread sections encounters an obstruction, the resultant stresses will nevertheless be transferred to all of the resilient block sections and distributed throughout the tire. The peculiar disposition of the normal stresses in the tire produces another desirable result which tends to greatly improve the riding qualities of a vehicle equipped with tires of this character, especially on a road surface which is impaired by depressions, such as worn places, depressed tracks and the like. The extent of contact between the tread of the tire and the road surface is never more than 2½ or 3 inches, while that of a pneumatic tire, for example, is usually from 4½ to 6 inches, therefore, the present tire in crossing a depression will bridge the latter, provided it is not too wide, whereas a pneumatic tire will sink down into the depression, due to the tendency of the latter to expand. This, therefore, results in the present tire operating much more smoothly upon roads having ruts or depressions.

It has been found in practice that a tire of the character described will cushion shocks of an amplitude of ⅜ths of an inch to ½ inch, without relieving the tension of any single unit or resilient block 5 to its point of inertia, and that even if shocks of greater amplitude are encountered, and which would ordinarily be passed to the spring suspension of the vehicle through the tire, the resilient blocks in the immediate vicinity of the application of the shock or stress possess sufficient compressibility to absorb the shock, each rubber section so effected being converted into a powerful bumper.

The ability of the tire to resist the most severe side thrusts is accomplished by means of the powerful compression springs 22 mounted and securely locked in position between the two upper anchorages of the several resilient blocks. These springs exert a powerful laterally tending pressure between the tread sections, which is transferred by the outer anchor members to the bodies of the resilient blocks, which stretches and holds the material under a lateral tension, which is sufficient to resist any lateral thrust on the tire, not sufficient to actually rupture the resilient blocks.

It will therefore be apparent that every substantial and essential quality making for efficiency in a tire is present and provided for in the construction described. The latter is equal to the best pneumatic tire in riding qualities and in appearance, and possesses none of the elements of weakness or defects of the pneumatic tire, or of the solid rubber tire. Moreover, the tire is not impaired if even a relatively large number of the resilient blocks 5 or their connections to the rim and tread are impaired, for the reason that the remaining intact elements will take up the functions of the impaired elements with only a slight decrease in the efficiency and smoothness of operation of the tire.

What I claim is:—

1. A resilient tire comprising a rigid rim, a continuous annular tread spaced from the rim, resilient blocks interposed between the rim and tread, and means for locking said blocks to the rim and tread and imposing a radial tensional stress on said blocks to strain the latter toward the center of the tire.

2. A resilient tire comprising a rigid rim, a continuous annular tread spaced from the rim, resilient blocks interposed between the rim and tread, means for attaching the blocks to the tread, and means for drawing the blocks toward the rim and locking said blocks thereto, whereby said blocks are subjected to a radial tensional strain.

3. A resilient tire comprising a rigid rim, a continuous annular tread spaced from the rim, resilient blocks interposed between the rim and tread, inner and outer anchoring devices embedded in the blocks, means for connecting the outer anchoring devices to the tread, and adjustable means for connecting the inner anchoring devices to the rim, whereby said blocks are subjected to radial tensional strain and normally stretched between the tread and rim.

4. A resilient tire comprising a rigid rim, a tread including a metal hoop and a resilient sheath therefor spaced from the rim, resilient blocks interposed between the rim and tread, and means for locking said blocks to the rim and tread and imposing a radial tensional stress on said blocks to strain the latter toward the geometrical center of the tire.

5. A resilient tire comprising a rigid rim, a tread including a metal hoop and a resilient sheath therefor, resilient blocks interposed between the rim and tread, means for attaching the blocks to the hoop member of the tread, and means for drawing the blocks toward the rim and locking said blocks thereto, whereby said blocks are subjected to a radial tensional strain.

6. A resilient tire comprising a rigid rim, a tread including a metal hoop and a resilient sheath therefor spaced from the rim, resilient blocks interposed between the rim and tread, inner and outer anchoring devices embedded in the blocks, means for connecting the outer anchoring devices to the hoop member of the tread, and adjustable means for connecting the inner anchoring devices to the rim, whereby said blocks are subjected to a radial tensional stress and normally stretched between the tread and rim.

7. A resilient tire comprising a rigid rim, a tread including a pair of laterally spaced hoops and resilient sheaths therefor, resilient blocks interposed between the rim and tread, inner and outer anchoring devices embedded in the blocks, means for connecting the outer anchoring devices to the hoop members of the tread, and adjustable means for connecting the inner anchoring devices to the rim, whereby said blocks are subjected to a radial tensional stress and normally stretched between the tread and rim.

8. A resilient tire comprising a rigid rim, a tread including a pair of laterally spaced hoops and resilient sheaths therefor, resilient blocks interposed between the rim and tread, inner and outer anchoring devices embedded in the blocks, means for connecting the outer anchoring devices to the hoop members of the tread, resilient compression devices located between the tread members and tending to force said tread members apart laterally, and adjustable means for connecting the inner anchoring devices to the rim, whereby said blocks are subjected to a radial tensional stress and normally stretched between the tread and rim.

9. A resilient tire comprising a rigid rim, a continuous annular tread including a metal core and a resilient sheath therefor, resilient blocks interposed between the rim and the tread, anchoring devices embedded in the outer portions of the blocks and secured to the tread core, anchoring plates embedded in the inner portions of the blocks, and locking bolts passing through the rim and engaging the plates and adapted to impose a radial tensional strain on the blocks when the latter are drawn toward the rim.

10. A resilient tire comprising a rigid rim, a continuous annular tread including a pair of laterally spaced metal cores and resilient sheaths therefor, resilient blocks interposed between the rim and the tread, anchoring devices embedded in the outer portions of the block and secured to the cores of the tread, anchoring plates embedded in the lower portions of the blocks, and locking bolts passing through the rim and engaging the plates and adapted to impose a radial tensional strain on the blocks when the latter are drawn toward the rim.

11. A resilient tire comprising a rigid rim, a continuous annular tread including a pair of laterally spaced metal cores and resilient sheaths therefor, resilient blocks interposed between the rim and the tread, anchoring devices embedded in the outer portions of the block and secured to the cores of the tread, resilient compression members between said anchoring devices and tending to spread the same laterally apart, anchoring plates embedded in the lower portions of the blocks, and locking bolts passing through the rim and engaging the plates and adapted to impose a radial tensional strain on the blocks when the latter are drawn toward the rim.

12. A resilient tire comprising a rigid rim, a continuous annular tread including a pair of laterally spaced metal cores and resilient sheaths therefor, resilient blocks interposed between the rim and the tread, anchoring devices embedded in the outer portions of the block and secured to the cores of the tread, compression springs interposed between said anchoring devices and tending to spread the same laterally apart, anchoring plates embedded in the lower portions of the blocks, and locking bolts passing through the rim and engaging the plates and adapted to impose a radial tensional strain on the blocks when the latter are drawn toward the rim.

13. A resilient tire comprising a rigid rim, a continuous annular tread spaced from the rim, a rubber element interposed between the rim and tread, means for attaching said element to the tread, and means for stretching said rubber element toward the rim and locking it thereto, for the purpose set forth.

Signed at New York, in the county of New York and State of New York, this 23rd day of May, A. D. 1917.

GARRETT JOHN COUCHOIS.

Witnesses:
   C. J. BUTLER,
   MARCEL MULET.